Patented Oct. 26, 1926.

1,604,314

UNITED STATES PATENT OFFICE.

HENRY L. PRESTHOLDT, OF MINNEAPOLIS, MINNESOTA.

CASEIN GLUE.

No Drawing.   Application filed April 17, 1922.   Serial No. 554,203.

My present invention provides a new composition of matter herein designated as "casein glue", but which, from its broader aspect, is an adhesive composition adapted to be used, by itself or commingled with other substances, as an adhesive coating.

In this improved adhesive composition, casein is used as the adhesive base and is commingled with calcium hydroxide, magnesium oxide, sodium sulphate and arsenic, and also preferably with hydrocarbon oil and resin. The arsenic acts as an antiseptic and preservative and increases the quality of the colloidal properties of the glue. The glue made from this composition is exceptionally cheap and has very great adhesive qualities, adapting it for general use as a glue or adhesive coating.

I have obtained a very highly efficient glue or adhesive by the use of the above substances in accordance with the following formula:

| | Parts. |
|---|---|
| Casein | 50 to 75 |
| Calcium hydroxide | 8 to 10 |
| Magnesium oxide | 10 to 20 |
| Sodium sulphate | 3 to 10 |
| Arsenic | 0 to 5 |
| Hydrocarbon oil | 3 to 6 |
| Resin | 1 to 4 |

The above noted substances are commingled in dry powdered form and are sold in that condition. When the composition is to be used, it is introduced into water to form an emulsion, and it is then, of course, that the chemical reactions that develop the adhesive qualities of the composition, will take place. After the reactions have taken place, the emulsion is adapted to be used as glue or as a coating or to be commingled with other substances, such as paints or calcimine, which contain certain color pigments. When desired, however, the color-producing pigments may be commingled with the dry composition. When the composition is to be used simply as a glue, no additions to the formula given, except water, will be required.

Casein in this formula contributes the colloidal properties, which make up the adhesiveness of the glue powder. In order to effect solution, I use sodium sulphate in combination with calcium hydroxide and magnesium oxide. Calcium hydroxide has the peculiar qualities of combining with the casein, forming insoluble calcium caseinates, adding waterproof qualities to the glue powder, but the use of calcium hydroxide alone would not form a stable glue powder and, for this reason, I add a larger portion of magnesium oxide, which prevents the formation of ammonia and protects the glue from becoming gelatinous and setting up in too short a time. The small amount of arsenic used has a tendency to increase the colloidal properties of the glue, giving it greater adhesive power. The hydrocarbon oil is incorporated for the purpose of protecting the calcium hydroxide from changing into a calcium carbonate in contact with the air.

The hydrocarbon oil used will usually be kerosene, benzine, or an oil known as "mineral seal."

While resin, for some purposes, improves the quality of the glue, nevertheless, it may be omitted without greatly changing the character of the glue.

What I claim is:

1. An adhesive compound made substantially in accordance with the following formula:

| | Parts. |
|---|---|
| Casein | 50 to 75 |
| Calcium hydroxide | 8 to 10 |
| Magnesium oxide | 10 to 20 |
| Sodium sulphate | 3 to 10 |
| An oil | 3 to 6 |
| Arsenic | ½ to 5 |

2. An adhesive composition made in accordance with the following formula:

| | Parts. |
|---|---|
| Casein | 50 to 75 |
| Calcium hydroxide | 8 to 10 |
| Magnesium oxide | 10 to 20 |
| Sodium sulphate | 3 to 10 |
| Arsenic | 0 to 5 |
| Hydrocarbon oil | 3 to 6 |
| Resin | 1 to 4 |

In testimony whereof I affix my signature.

HENRY L. PRESTHOLDT.